UNITED STATES PATENT OFFICE.

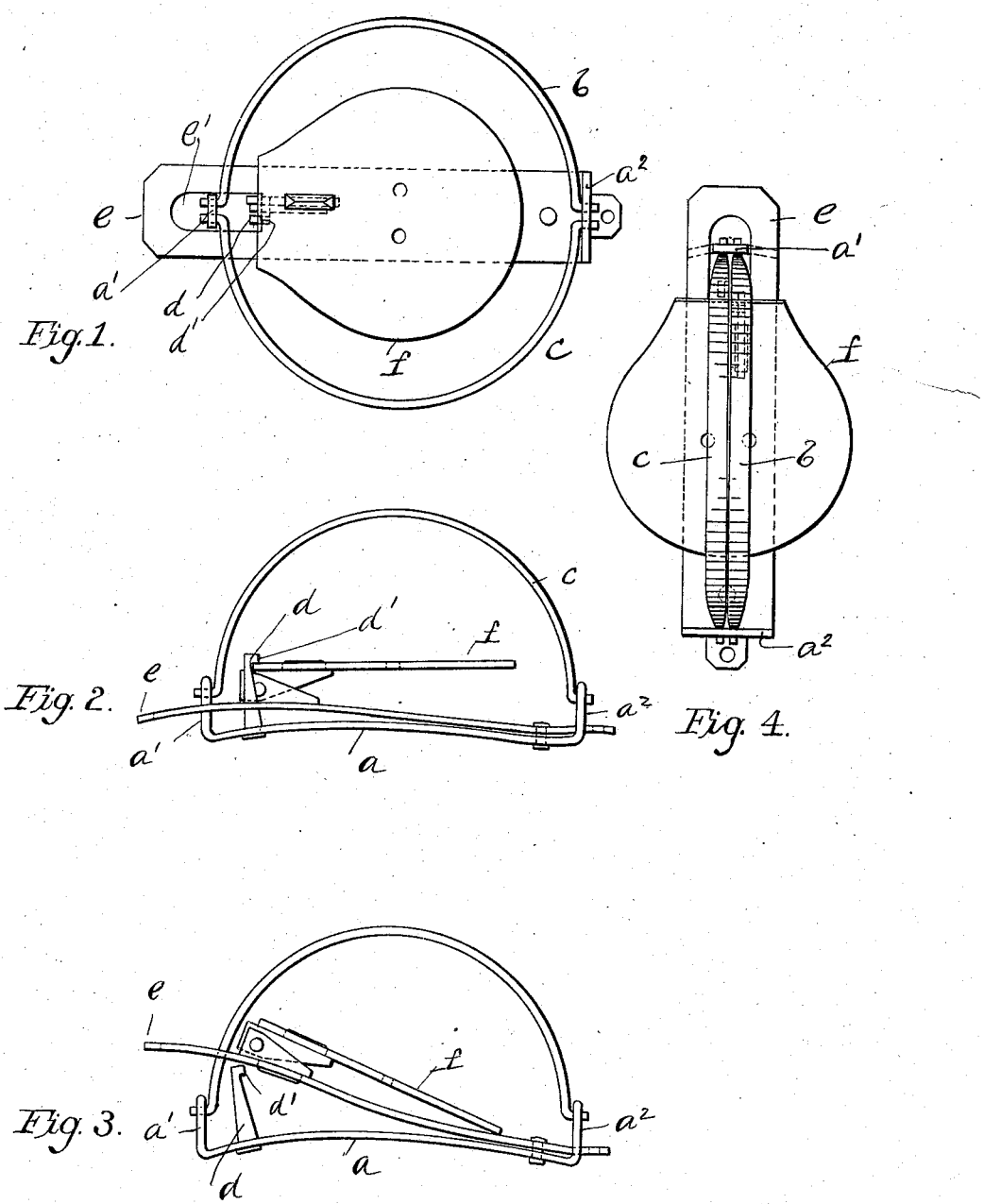

GEORGE W. LEAVENWORTH, OF HARTFORD, CONNECTICUT, ASSIGNOR TO HOMER H. JUDD, OF BRISTOL, CONNECTICUT.

TRAP.

No. 867,920.     Specification of Letters Patent.     Patented Oct. 8, 1907.

Application filed March 28, 1907. Serial No. 364,976.

*To all whom it may concern:*

Be it known that I, GEORGE W. LEAVENWORTH, a citizen of the United States of America, residing at Hartford, in the county of Hartford and State of Connecticut, have invented certain new and useful Improvements in Traps, of which the following is a specification.

The object of the invention is to produce an article of the character described having features of novelty and advantage.

In the drawings—Figure 1 is a plan view showing the trap set. Fig. 2 is a side view thereof. Fig. 3 is a side view showing the trap sprung. Fig. 4 is a plan view showing the trap sprung.

Referring to the drawings $a$ denotes the base having its ends upturned as at $a'$ $a^2$ and pierced to receive the ends of the jaws $b$ $c$, giving them a pivotal support. Near one end of the base there is rigidly mounted the post $d$ provided with a locking notch $d'$. The spring $e$ at one end is secured to the base at the opposite end from the post; its free end has an opening $e'$ through which pass the ends of the jaws in order that the jaws may be closed quickly and surely when the spring is tripped. On the spring there is pivotally mounted the pan $f$. It will be seen from the drawings that when the spring is depressed the post projects through the opening $e'$.

To set the trap the spring is depressed until the pan can be raised to bring its edge into engagement with the notch in the post.

The advantages of the construction are that but one of the tripping parts is movable; the post is rigid and after the spring is depressed the pan is raised until it engages the notch in the post. The post provides a means for holding the trap securely in its set position and yet the locking device is sensitive enough so that a slight pressure on the pan will snap the trap. Another great advantage in the construction is that the trap can be set without opening the jaws as the post is located between the ends of the jaws and projects up through the opening in the spring. These traps are made of different weights and are often used about the house where they are to be set by women. In traps of this general character as they have been made heretofore one part of the locking or setting mechanism overlies the jaws and in consequence it is necessary to hold the jaws open in order to set the trap. It very often happens that by carelessness or inadvertence the spring is released and the trap sprung prematurely, in which case painful injury is apt to be done to the person setting the trap. All possibility of an occurrence of this sort is removed in my trap and as above stated it can be set or sprung while the jaws are closed.

I claim as my invention:—

1. In an article of the character described comprising a base having upturned ends, jaws pivotally supported in these upturned ends, a spring secured at one end to one end of the base, the opposite end of the spring having an opening therethrough for the jaws, a pan pivotally supported on the spring, and a locking post rigidly secured to the base and adapted to engage said pan.

2. In an article of the character described comprising a base, jaws pivotally supported thereon, a spring secured at one end to the base and having an opening through its opposite end for the jaws, a pan pivotally supported on the spring with an edge adjacent to said opening, and a post rigidly secured to said base and adapted to project through said opening to engage said pan.

3. In an article of the character described comprising a base having jaws pivotally supported thereon, a spring secured at one end to the said base and having an opening through its opposite end for said jaws, a pan pivotally secured to said spring within said jaws, and a post rigidly secured to said base between the pivotal points of said jaws and adapted to engage said pan to hold the spring in active position.

4. In an article of the character described comprising a base having upturned ends, jaws pivotally supported in these upturned ends, a spring secured at one end to one end of the base, the opposite end of the spring having an opening therethrough for the jaws, a pan pivotally supported on the spring, and means rigidly secured on the base and adapted to engage said pan, as and for the purposes specified.

In testimony whereof I affix my signature in presence of two witnesses.

GEORGE W. LEAVENWORTH.

Witnesses:
GEO. B. WARD,
D. S. KREIMENDAHL.